United States Patent [19]

Kelly

[11] Patent Number: 4,670,158
[45] Date of Patent: Jun. 2, 1987

[54] PRIMARY TREATMENT OF WASTEWATER

[75] Inventor: Paul R. Kelly, Simpsonville, S.C.

[73] Assignee: National Starch and Chemical Corporation, Bridgewater, N.J.

[21] Appl. No.: 424,133

[22] Filed: Sep. 27, 1982

[51] Int. Cl.$^4$ .............................................. C02F 1/54
[52] U.S. Cl. ................................... 210/705; 210/725; 210/727
[58] Field of Search ............... 210/705, 724, 725, 726, 210/727, 703

[56] References Cited

U.S. PATENT DOCUMENTS 3,617,568  11/1971  Ries ..................................... 210/727
3,963,637  6/1976  Chappell ............................. 210/726

FOREIGN PATENT DOCUMENTS 51-66159  6/1976  Japan ................................... 210/726

OTHER PUBLICATIONS

Buisson, *Chemistry Division Department of Scientific and Industrial Research, New Zealand*, Report No. C.D. 2250, "Treatment of Rubber Latex Wastes", 31 pp. (Mar. 1977).

*Primary Examiner*—Benoit Castel
*Attorney, Agent, or Firm*—Edwin M. Szala; Ellen T. Dec

[57] ABSTRACT

A process for treating waste water which contains an undesirable level of suspended organic materials comprising a precipitation and coagulation by the controlled addition of lime and phosphoric acid.

5 Claims, 1 Drawing Figure

PRIMARY TREATMENT OF WASTEWATER

BACKGROUND OF THE INVENTION

I. Field of the Invention

This invention relates to a process for treating wastewater which contains an undesirable level of suspended organic materials. In a further aspect, the invention relates to a process for treating wastewater such as is obtained in connection with polymerization processes and chemical compounding.

II. Brief Description of the Prior Art

Large amounts of wastewater are generated in connection with the running of chemical plants where chemical compounding and latex polymerization processes, for example, are carried out on a daily basis. Such wastewater is loaded with suspended and dissolved organic materials including mixed polymer latex wastes also including various ionic and non-ionic surfactants at solids concentrations typically ranging from 0.05 to 5 weight percent. Based on ecological considerations, disposal of such untreated wastewater by downstream dumping or draining in leach fields is often restricted or prohibited by statute.

A variety of processes are known for the primary treatment of wastewater containing the mentioned contaminants. A representative process of the prior art comprises the precipitating and coagulating of the solids therein by chemical means and subjecting the wastewater to a step of dissolved air flotation so as to float the sludge formed of coagulated particulates to the surface. The sludge is separated from the liquid by mechanical means and is thereafter buried while the treated wastewater is disposed of by spray irrigation in slow rate land treatment or leach fields. Lime, hydrated calcium oxide, in conjunction with ferric chloride, ferric sulfate, or alum, is commonly used to precipitate and coagulate the solids. In other processes ferric chloride is used in conjunction with sodium hydroxide. None of such processes is favored in that use of the mentioned reagents adds undesirable leachable anions such as chloride or sulfate anions to the wastewater. Thus the prior art lacks an efficient treatment process containing a chemical coagulation step which does not add any undesirable anions and cations to the wastewater.

It is an object of this invention to provide a process for treating wastewater which contains an undesirable level of suspended organic materials while avoiding the addition of chloride or sulfate anions and sodium cations.

It is a further object of this invention to provide an efficient process for treating wastewater yielding high solids separation.

These and other objects will be achieved in accordance with the invention described below.

SUMMARY OF THE INVENTION

I have found that the use of lime and phosphoric acid in controlled amounts in a primary wastewater treatment process gives high solids separation efficiencies and yields treated wastewater with desirable low solids and ionic content for further disposal by spray irrigation.

Thus in accordance with the present invention there is provided a process for treating wastewater which contains an undesirable level of organic materials comprising the steps of (1) adding from 0.02 to 0.20 weight percent of lime to the wastewater to be treated, (2) adjusting the pH of the wastewater to be within 7.0 to 10.0, preferably 8.5 to 9.0, with phosphoric acid, (3) separating and removing the flocculated solids sludge from the wastewater thereby obtaining treated wastewater with low solids containing no added undesirable anions or cations.

It can be understood that the amount of lime needed in any given system will vary with the concentration and nature of waste in the water and can be determined by the practitioner. For most systems, the preferred amount of lime added will range from 0.08 to 0.16 weight percent of the wastewater to be treated. With respect to phosphoric acid addition, a pH range of 7.0 to 10.0 is fully effective for the process herein, however, for ecological and other reasons, a practical, preferable working range is from pH 8.0 to 9.5 and most preferably pH 8.5 to 9.0.

In wastewater treatment processes carried out in connection with on-going polymerization and other chemical processes, polymeric flocculants comprising cationic, anionic and non-ionic polymers, as are known in the art for this use, are often added after the addition of phosphoric acid, step (2) above, to aid in the flocculation of the wastewater solids. Ordinarily, when added, the cationic polymer or non-ionic polymer is added in amounts up to about 800 ppm, preferably from 50 to 500 ppm, while the anionic polymer is added in amounts up to about 100 ppm, preferably from 10 to 60 ppm. The addition of such polymers is known to aid the coagulation of solids by lowering the charge of the wastewater particles as well as causing interparticle bridging, thereby increasing the size of the particle aggregates. The addition of such polyeletrolyte polymers (including non-ionic polymers) is optional herein and whether such addition is needed, the order of addition and concentration levels can be decided by the practitioner.

DESCRIPTION OF THE PREFERRED EMBODIMENTS

Figure 1:
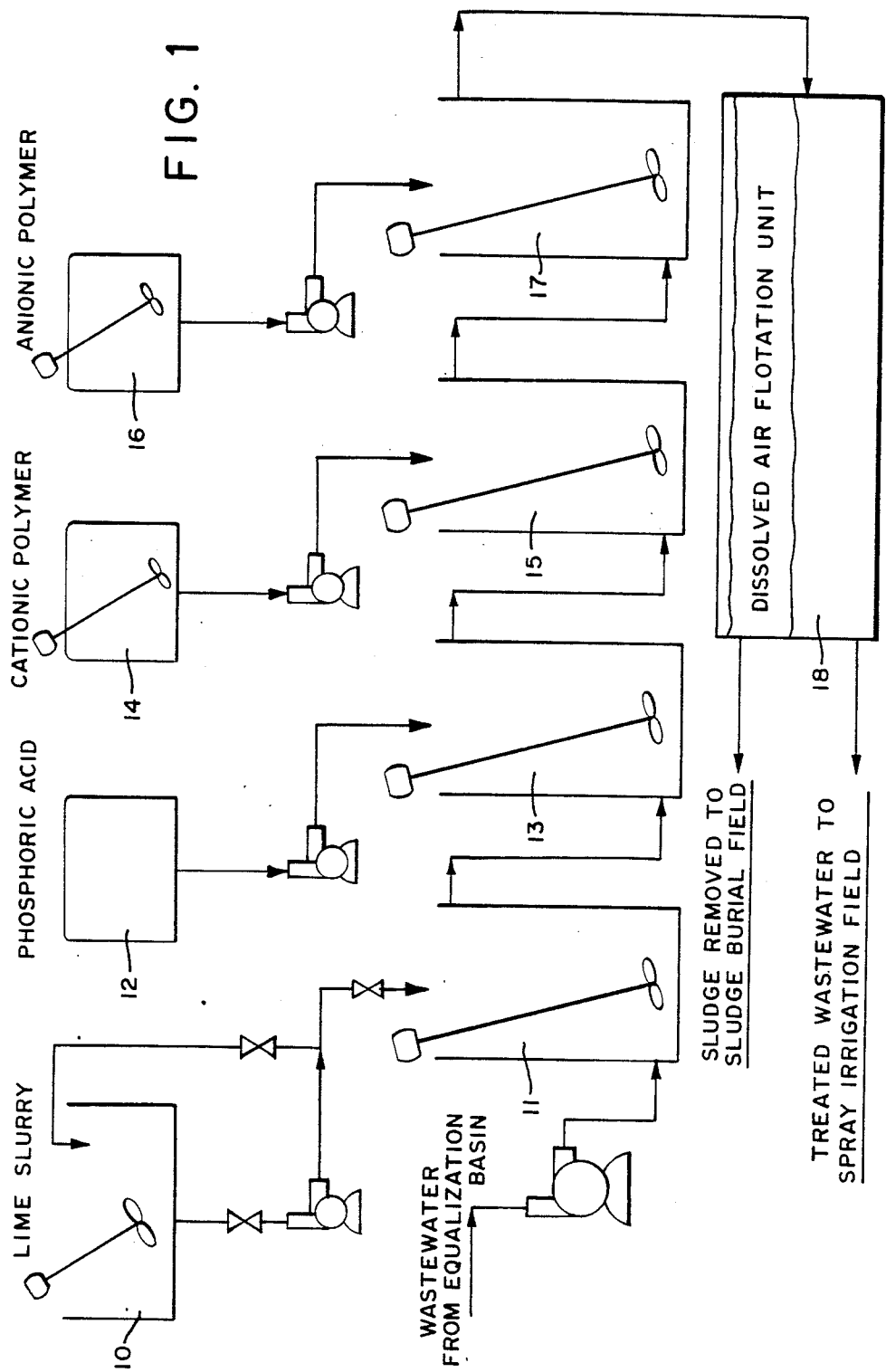

In the described process, the lime is conveniently added in the form of a slurry containing about 20 weight percent of hydrated calcium oxide [$Ca(OH)_2$] in water. The phosphoric acid is commonly used as a 75 weight percent solution.

A variety of waste treatment polymers (cationic and anionic, also non-ionic) for enlarging and concentrating the floc during the primary precipitation and coagulation is available commercially. For the most part such flocculants polymers are synthetic, high molecular weight polyelectrolytes, such for example as polyquaternary amines and sulfonated polystyrene homo- and copolymers. Useful cationic polymers available commercially include American Cyanamid 581 C and 591 C, and Primafloc C-3 supplied by Rohm and Haas. Commercially available anionic polymers include Hydraid 771 supplied by Calgon Co. and Hercules 1031. Non-ionics including polyacrylamide and its copolymers may also be used in some instances. As in the prior art, any of the synthetic or natural flocculants may be used.

It can be understood that the process of this invention can be run as a continuous process as well as a batch process.

The invention can be better understood from a consideration of the accompanying drawing, FIG. 1, in which a continuous process is shown in diagrammatic form.

Referring more particularly to FIG. 1, a stream of wastewater from an equalization basin in pumped into a mixing tank 11. A slurry of lime from adjacent tank 10 is pumped into 11 and thereafter the lime containing wastewater is cascaded to adjacent tank 13 into which phosphoric acid is pumped from tank 12. The wastewater in 13 is cascaded into tanks 15 and 17 sequentially after the separate addition of cationic and anionic polymer solutions. It is to be noted that while such addition of polymer is illustrated in FIG. 1, their use is optional in the process herein. It is also to be noted that the sequence of adding the cationic, non-ionic and anionic polymer is not critically important and may be reversed by the practitioner. The treated wastewater in 17 is pumped to a dissolved air flotation unit 18 where the particulates are floated towards the top of the unit to form a layer of floc or sludge which is removed and taken to a sludge burial field. The treated wastewater is disposed by pumping to a spray irrigation field and spraying onto slow rate land treatment or leach fields having suitable drainage.

In the study of the instant process, the wastewater before treatment typically contained mixed polymer latex wastes at concentrations of from 0.05 to 5.0 weight percent. After primary treatment of the wastewater followed by addition of polymeric flocculant and dissolved air flotation, a sludge was recovered typically containing solids from 22 to 26 weight percent. The treated wastewater effluent contains solids in the range of 0.02 to 0.50 weight percent.

The separation and removal of the sludge from the treated wastewater can be carried out by known settling or flotation procedures. In a typical settling procedure, the wastewater is held in a settling tank without agitation and the sludge particulates settle to the bottom of the tank. Ordinarily, the bottom of such tank is constructed to be faced in towards the center where the sludge (approximately 10 percent solids) is drawn down or pumped for disposal by burial.

In a flotation procedure, mild agitation is provided and air is bubbled through the treated wastewater to float the waste particles towards the top of the tank. The sludge can be pumped from the upper portion of the tank or removed with paddles or skimmers, continuously or intermittently.

While use of the instant process provides a number of benefits, two such benefits are particularly advantageous. The instant process provides a significant reduction in leachable anions to the point where chemical oxygen demand (C.0.D.), and not chlorides or sulfates as is most often found in prior art processes, is now the limiting factor in determining the amount of acreage needed for assimilation of the treated wastewater. Secondly, the addition of calcium to the wastewater has improved the sodium acceptance ratio (S.A.R.) to the point where sodium is no longer a concern and there is no risk to the clay soils of the spray or leach fields used in the final disposal of the wastewater.

The examples which follow illustrate the embodiment of the invention. In these examples, all percentages are given by weight.

EXAMPLE I

This example illustrates the process of the invention carried out on a laboratory scale.

A 1,000 ml sample of wastewater taken from a wastewater storage basin of a chemical plant was placed in a beaker and stirred. The wastewater contained 2.6 percent solids and had a slightly milky white color. Six ml of a calcium oxide slurry (20 percent solids) was added to the wastewater and stirring was continued for about eight minutes. Phosphoric acid (75 percent) was added drop by drop, to a pH end-point 8.9 to 9.0. A cationic polymer, Rohm and Haas' Primafloc C-3, 4.0 ml of a 10 percent solution, was added to the stirring mixture which was allowed to stir for about eight minutes after the addition. Thereafter, an anionic polymer, Hercules 1031, 4.0 ml of a 1 percent solution, was added and stirring continued for an additional 1 to 2 minutes. A coherent floc quickly settled to the bottom of the beaker after the stirring was stopped. The supernatant was clear and nearly colorless and contained 0.3 percent solids.

Example II

The general procedure of Example I was repeated using a 1,000 ml sample of wastewater containing 2.5 percent solids. In this example, however, only the calcium oxide and phosphoric acid (to a pH end-point of 8.8) were added to the wastewater, and the steps of adding cationic and anionic polymer were omitted. When the treated wastewater was allowed to settle, a floc formed on the bottom of the beaker and the supernatant was clear. The supernatant contained 0.3 percent solids.

Example 111

This example illustrates the process of the invention carried out as a chemical plant procedure.

Wastewater supplied from an equalization storage basin containing 2.5 percent solids was pumped to the first of a series of four continuous stirred tank reactors in a continuous flow-through cascade system. Each tank reactor had a capacity of 3,000 gallons, and the flow rate varied from about 120 to 200 gallons per minute. A lime slurry (calcium oxide, 20 percent solids) was added to the first reactor at a flow rate of 0.75 to 1.0 gallons per minute. Phosphoric acid (75 percent) was added to the second reactor to maintain a pH end-point of 8.8 to 9.1. Cationic polymer, American Cyanamid 581 C, was added as a 10 percent solution to achieve a concentration of about 400 ppm in the third reactor. A 1 percent solution of anionic polymer, Hercules 1031, was added to the fourth reactor in an amount to maintain a concentration of about 40 ppm. The treated wastewater was then pumped to a dissolved air flotation tank, and sludge flotation was effected with the use of air bubbles. The sludge (22 percent solids) was removed from the top of the tank with horizontal driven paddles. The treated wastewater which contained from about 0.17 to 0.3 percent solids was pumped from the tank and transferred for spraying onto a leach field.

Example IV

This example illustrates the process of the invention carried out on very dilute wastewater containing latex waste obtained from a polymer plant.

A 1,000 ml sample of wastewater containing 0.07 percent solids was placed in a beaker and stirred. Approximately one ml of a calcium oxide slurry (20 percent solids) was added to the wastewater and stirring was continued for about eight minutes. Phosphoric acid (75 percent) was added drop by drop to a pH end-point of 8.0. Thereafter, 5 drops of a 10 percent solution of American Cyanamid 581 C was added to the stirring mixture. After stirring for about eight minutes, 5 drops of a 1 percent solution of Hercules 1031 was added to the mixture and stirring continued for about 2 minutes. A light, coherent floc settled (about 2 minutes) to the bottom of the beaker after stirring was stopped. The supernatant was clear and contained 0.03 percent solids.

In summary, the present invention is seen to provide a process for treating wastewater containing an undesirable level of organic matter wherein the coagulation of the solids is effected without the use of added chloride or sulfate anions or sodium cation.

Now that the preferred embodiments have been described in detail, various modifications and improvements thereon will become readily apparent to those skilled in the art. Accordingly, the spirit and scope of the present invention are to be limited only by the appended claims, and not by the foregoing specification.

What is claimed is:

1. A process for treating wastewater containing an undesired level of suspended organic materials comprising polymeric latex wastes and a solids content of from about 0.05 to 5.0 weight percent, said process consisting essentially of:

(1) adding from 0.02 to 0.20 weight percent lime to the wastewater to be treated,
    (2) adding to the wastewater phosphoric acid, in an amount sufficient to lower the pH below 10.0 but not lower than 7.0, and
    (3) separating and removing flocculated solids sludge from the wastewater thereby obtaining treated wastewater having a solids content of less than 0.05 weight percent, adding a cationic or non-ionic polymer in an amount up to 800 ppm after the addition of the phosphoric acid and prior to step (3), and adding an anionic polymer in an amount up to 100 ppm after the addition of the cationic or non-ionic polymer or after the addition of the phosphoric acid and prior to step (3).

2. The process of claim 1 wherein the pH of the wastewater in step (2) is adjusted to be within 8.0 to 9.5.

3. The process of claim 1 run as a continuous process and the amount of lime added in step (1) is from 0.08 to 0.16 weight percent.

4. The process of claim 1 wherein the separation of the flocculated solids sludge is carried out by flotation using air bubbles.

5. The process of claim 1 wherein the separation of the flocculated solids sludge is carried out by settling.

* * * * *